Patented Apr. 24, 1945

2,374,385

UNITED STATES PATENT OFFICE 2,374,385

VULCANIZATION OF COPOLYMERS OF CONJUGATED DIENE HYDROCARBONS AND ALPHA-METHYLENE NITRILES

Doran E. Sauser, Cuyahoga Falls, Ohio, assignor, by mesne assignments, to The B. F. Goodrich Company, Akron, Ohio, a corporation of New York No Drawing. Application May 17, 1941, Serial No. 394,036

15 Claims. (Cl. 260—79)

This invention relates to the vulcanization of copolymers of conjugated diene hydrocarbons and alpha-methylene nitriles, and has as its principal object to provide a vulcanizing agent which may be substituted for sulfur wholly or in part to produce vulcanizates having improved physical properties such as tensile strength and elongation.

It has previously been proposed to vulcanize natural rubber in the presence of bis(oxythiono) polysulfides. These materials are not particularly useful in natural rubber, however, unless sulfur and an aniline type accelerator are employed in conjunction therewith. Use of bis(oxythiono) polysulfides as a replacement for sulfur in natural rubber produces vulcanizates of inferior physical properties.

I have now found that when bis(oxythiono) polysulfides are employed as vulcanizing agents, as distinguished from accelerators, in synthetic rubbers prepared by the copolymerization of a conjugated diene hydrocarbon and an alpha-methylene nitrile, vulcanizates having greatly improved physical properties are produced.

Bis(oxythiono) polysulfides are a class of compounds which may be represented by the structural formula

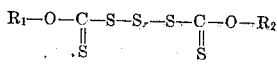

In the preferred compounds $R_1$ and $R_2$ represent the same or different functionally aliphatic groups such as alkyl, alkenyl, aralkyl, or cycloalkyl groups. The trisulfides, wherein $x$ represents 1, may be prepared by the reaction of an alkali metal xanthate with sulfur dichloride, while the tetrasulfides, wherein $x$ represents 2, may be prepared by the reaction of an alkali metal xanthate with sulfur monochloride. Other polysulfides of unknown structure containing a higher proportion of sulfur than the tetrasulfides are also within the scope of the invention. In general, however, the bis(alkoxythiono) tetrasulfides are found to be most suitable for use on a commercial sale. Specific compounds which may be employed as vulcanizing agents include bis-(methoxythiono) tetrasulfide, bis(ethoxythiono) tetrasulfide, bis(n-propoxythiono) tetrasulfide, bis(isopropoxythiono) tetrasulfide, bis(n-butoxythiono) tetrasulfide, bis(isobutoxythiono) tetrasulfide, bis(sec-butoxythiono) tetrasulfide, bis-(terbutoxythiono) tetrasulfide, bis(n-amyloxythiono) tetrasulfide, bis(pri-act-amyloxythiono) tetrasulfide, bis(sec-act-amyloxythiono) tetrasulfide, bis(ter-amyloxythiono) tetrasulfide, bis(cyclohexyloxythiono) tetrasulfide, bis(benzyloxythiono) tetrasulfide bis(allyloxythiono) tetrasulfide, bis(isopropenyloxythiono) tetrasulfide, and the corresponding trisulfides.

The synthetic rubbers with which this invention is concerned are formed by the copolymerization, preferably in the form of an aqueous emulsion, of a conjugated diene hydrocarbon such as butadiene (by which is meant butadiene-1, 3), isoprene, 2,3-dimethyl butadiene, piperylene, etc., with an alpha-methylene nitrile, by which is meant nitriles containing a methylene group attached to the carbon atom adjacent to the —C≡N group, such as acrylonitrile, alpha-methacrylonitrile, alpha-ethacrylonitrile, alpha-methoxymethacrylonitrile, alpha-chlormethylacrylonitrile, etc. The nitrile is preferably employed in a smaller amount than the diene, although the use of greater amounts of nitrile produces compositions which can be vulcanized by the method herein described to produce compositions resembling leather rather than rubber.

As a specific example of one embodiment of this invention, I will show the manner in which one of the vulcanizing agents of this invention may be employed in a "pure gum" stock, i. e., a composition containing no fillers or reinforcing pigments or only insignificant amounts thereof. Synthetic rubber prepared by the emulsion copolymerization of 55 parts by weight of butadiene and 45 parts of acrylonitrile was mixed with 5 parts of zinc oxide, 1.5 parts of stearic acid, 1.25 parts of an accelerator consisting of a mixture of approximately 80 parts of 2-mercapto-4,5-dimethyl-thiazole and 20 parts of 2-mercapto-4-ethylthiazole, and 1.25 parts of sulfur. When the composition was heated in a press for 30 minutes at 310° F., a vulcanizate having a tensile strength of 1100 lbs./in.$^2$ and an elongation of 550% was produced. When 1 part of bis(isopropoxythiono) tetrasulfide was substituted for the sulfur in the above recipe, a vulcanizate having a tensile strength of 2000 lbs./in.$^2$ and an elongation of 880% was produced. The use of 3.68 parts of bis(isopropoxythiono) tetrasulfide (an amount which is found upon analysis to contain 1.25 parts of free sulfur) produced a vulcanizate having a tensile strength of 3125 lbs./in.$^2$ and an elongation of 670%.

In another example, 100 parts of the copolymer of butadiene and acrylonitrile known commercially as "Perbunan" were employed as the synthetic rubber in the above pure gum stock. The vulcanizate prepared with sulfur as the vulcanizing agent had a tensile strength of 750 lbs./in.$^2$ and an elongation of 390%, while the vulcanizate prepared with bis(isopropoxythiono) tetrasulfide had a tensile strength of 1025 lbs./in.$^2$ and an elongation of 600%.

In another example, a composition suitable for the manufacture of printing rolls was prepared by vulcanizing a mixture of 100 parts of an emulsion copolymer of butadiene and acrylonitrile, 25 parts of carbon black, 50 parts of dibutyl phthalate, 5 parts of zinc oxide, 1.5 parts of di-2-benzothiazyl disulfide, and 1 part of bis(isopropoxythiono) tetrasulfide. A vulcanizate with a tensile strength of 1075 lbs./in.$^2$ and an elongation of 900% was produced. When 1.5 parts of sulfur was substituted for the tetrasulfide as the vulcanizing agent, a vulcanizate with a tensile strength of only 400 lbs./in.$^2$ and an elongation of 430% was produced.

Thiazole-type accelerators, by which is meant accelerators deriving at least part of their activity from the presence of a substituted 2-thiothiazyl group, such as the mixture of 2-mercapto-4,5-dimethylthiazole and 2-mercapto-4-ethylthiazole employed above are the preferred accelerators for use with the vulcanizing agents of this invention. Other suitable thiazole-type accelerators besides the 2-mercaptoalkylthiazoles mentioned above are the aromatic 2-mercaptothiazoles such as 2-mercaptobenzothiazole, 2-mercaptonaphthothiazole, 2-mercaptotoluothiazole; the thiazyl disulfides such as di-2-benzothiazyl disulfide, di-2-(4-ethylthiazyl) disulfide, di-2-(4,5-dimethylthiazyl) disulfide; and the amino thiazyl sulfides such as 2-benzothiazyl diethylamino sulfide, 2-(4-ethylthiazyl) diethylamino sulfide, 2-benzothiazyl cyclohexylamino sulfide, etc.

It is within the scope of the invention, however, to employ other types of accelerators such as the aldehyde-amine condensation products which possess accelerating activity such as polybutylidene aniline, methylene paratoluidine, etc.; the dithiocarbamates such as zinc dimethyldithiocarbamate, zinc phenyl-beta-naphthyl dithiocarbamate, etc.; the thiuram sulfides such as tetramethyl thiuram monosulfide, tetramethyl thiuram disulfide, etc.; and the guanidine accelerators such as diphenyl guanidine, di-ortho-tolyl guanidine, etc.

As an example of the use of another type of accelerator, a mixture of 100 parts of an emulsion copolymer of 55 parts of butadiene and 45 parts of acrylonitrile, 5 parts of zinc oxide, 1.5 parts of stearic acid, 1.25 parts of di-ortho-tolylguanidine, and 3.68 parts of bis(isopropoxythiono) tetrasulfide was heated in a press for 30 minutes at 310° F. The vulcanizate had a tensile strength of 2500 lbs./in.$^2$ and an elongation of 800%. These values are much higher than those exhibited by pure gum stocks vulcanized with sulfur as a vulcanizing agent.

Although the use of the bis(oxythiono) polysulfides in the specific examples has been confined to pure gum stocks and printing roll compositions, the vulcanizing agents herein described may be similarly employed in any type of rubber composition such as those used for automobile tires and tubes, hose, belting, sheet and thread rubber, rubberized fabrics, molded goods, seamless dipped goods, boots and shoes, etc., whether vulcanized in a heated mold, in open steam, in hot air, in hot water, etc. The vulcanizing agents may be incorporated in the synthetic rubber while the rubber is being worked on a roll mill or masticated in an internal mixer, and the vulcanizing agents may be added alone, or in admixture with each other or with other compounding ingredients such as softeners, or in the form of a masterbatch. In case the synthetic rubber is in the form of a cement or dispersed in water or a solvent, the vulcanizing agent may be simply dissolved or emulsified therein.

The vulcanizing agents herein described may be employed in widely varying proportions. The use of from .5 to 5% based on the synthetic rubber is ordinarily sufficient, although greater or less amounts may be employed in some cases. While it is preferred to use a bis(oxythiono) polysulfide as the sole vulcanizing agent, the advantages herein described will be obtained to some extent when sulfur or another vulcanizing agent is only partially replaced by a bis(oxythiono) polysulfide. It is accordingly within the scope of the invention to add to the rubber before vulcanization both sulfur and a bis(oxythiono) polysulfide, although it is preferred to perform the vulcanization in the absence of any added elemental sulfur.

It may also be desirable in some instances to vulcanize a mixture of a copolymer of butadiene and acrylonitrile and natural rubber. Although the bis(oxythiono) polysulfides are not as satisfactory vulcanizing agents as sulfur in natural rubber, it will be found advantageous to employ the polysulfides when minor proportions of natural rubber are present in the synthetic rubber.

While I have herein disclosed certain specific embodiments of my invention, I do not intend to limit the invention solely thereto, for many modifications including substituting materials having equivalent properties and varying the proportions of materials used are within the spirit and scope of the invention as defined in the appended claims.

I claim:

1. The method which comprises vulcanizing a copolymer of a conjugated diene hydrocarbon and an alpha-methylene nitrile in the presence of a vulcanizing agent comprising a bis(oxythiono) polysulfide.

2. The method which comprises vulcanizing an emulsion copolymer of butadiene and a smaller amount of an alpha-methylene nitrile in the presence of a vulcanizing agent consisting of a bis(oxythiono) polysulfide in the absence of any added elemental sulfur.

3. The method which comprises vulcanizing an emulsion copolymer of butadiene and a smaller amount of acrylonitrile in the presence of a vulcanizing agent comprising a bis(alkoxythiono) tetrasulfide.

4. The method which comprises vulcanizing an emulsion copolymer of butadiene and a smaller amount of acrylonitrile in the presence of a vulcanizing agent consisting of a bis(alkoxythiono) tetrasulfide in the absence of any added elemental sulfur.

5. The method which comprises vulcanizing an emulsion copolymer of butadiene and a smaller amount of acrylonitrile in the presence of a vulcanizing agent consisting of a bis(alkoxythiono) tetrasulfide, and a accelerator driving at least part of its activity from the presence of a 2-thiothiazyl group, in the absence of any added elemental sulfur.

6. The method which comprises vulcanizing an emulsion copolymer of butadiene and a smaller amount of acrylonitrile in the presence of a vulcanizing agent consisting of a bis(alkoxythiono) tetrasulfide, and a 2-mercapto alkyl-thiazole.

7. The method which comprises vulcanizing an emulsion copolymer of 55 parts of butadiene and 45 parts of acrylonitrile in the presence of a vulcanizing agent comprising a bis(oxythiono) polysulfide.

8. The method which comprises vulcanizing an emulsion copolymer of 55 parts of butadiene and 45 parts of acrylonitrile in the presence of a vulcanizing agent consisting of bis(isopropoxythiono) tetrasulfide and an accelerator comprising 2-mercapto-4,5-dimethyl thiazole, in the absence of any added elemental sulfur.

9. The method which comprises vulcanizing an emulsion copolymer of butadiene and a smaller amount of acrylonitrile in the presence of a vulcanizing agent comprising bis(isopropoxythiono) tetrasulfide.

10. A vucanizate prepared by the method of claim 1.

11. A vulcanizate prepared by the method of claim 3.

12. A vulcanizate prepared by the method of claim 5.

13. A vulcanizate prepared by the method of claim 6.

14. A vulcanizate prepared by the method of claim 7.

15. A vulcanizate prepared by the method of claim 9.

DORAN E. SAUSER.